US006966189B2

(12) United States Patent
Lapergue et al.

(10) Patent No.: US 6,966,189 B2
(45) Date of Patent: Nov. 22, 2005

(54) SYSTEM FOR SEALING THE SECONDARY FLOW AT THE INLET TO A NOZZLE OF A TURBOMACHINE HAVING A POST-COMBUSTION CHAMBER

(75) Inventors: Guy Lapergue, Rubelles (FR); Guillaume Sevi, Ivry sur Seine (FR); Jacques Roche, Lisses (FR)

(73) Assignee: SNECMA Moteurs, Paris (FR)

( * ) Notice: Subject to any disclaimer, the term of this patent is extended or adjusted under 35 U.S.C. 154(b) by 6 days.

(21) Appl. No.: 10/847,864

(22) Filed: May 19, 2004

(65) Prior Publication Data

US 2005/0005607 A1 Jan. 13, 2005

(30) Foreign Application Priority Data

May 27, 2003 (FR) .................................. 03 06390

(51) Int. Cl.[7] ................................................ F02K 1/12
(52) U.S. Cl. ........................................................ 60/771
(58) Field of Search ............. 60/770, 771; 239/265.19, 239/265.33, 265.37, 265.39

(56) References Cited

U.S. PATENT DOCUMENTS

| | | | | |
|---|---|---|---|---|
| 3,972,475 | A * | 8/1976 | Nelson et al. | 239/127.3 |
| 4,043,509 | A * | 8/1977 | McHugh et al. | 239/265.41 |
| 5,101,624 | A | 4/1992 | Nash et al. | |
| 5,143,292 | A * | 9/1992 | Corsmeier et al. | 239/127.3 |
| 5,150,839 | A * | 9/1992 | Reedy | 239/265.41 |
| 5,222,692 | A | 6/1993 | Glowacki | |
| 5,522,546 | A * | 6/1996 | Jarvis | 239/265.19 |
| 5,560,198 | A | 10/1996 | Brewer et al. | |
| 5,897,120 | A | 4/1999 | Scavo et al. | |
| 6,751,944 | B2 * | 6/2004 | Lair | 60/226.3 |
| 2003/0046940 | A1 | 3/2003 | Matsuda et al. | |
| 2003/0182929 | A1 * | 10/2003 | de Verduzan et al. | 60/266 |

FOREIGN PATENT DOCUMENTS

| | | |
|---|---|---|
| DE | 44 08 260 | 9/1995 |

* cited by examiner

*Primary Examiner*—Ehud Gartenberg
(74) *Attorney, Agent, or Firm*—Oblon, Spivak, McClelland, Maier & Neustadt, P.C.

(57) ABSTRACT

A turbomachine comprising, downstream from the turbine, a post-combustion chamber defined by a thermal protection lining inside a casing defining an annular channel for a secondary flow, an annular diaphragm secured at the downstream end of said channel, said nozzle comprising a plurality of flaps hinged to the upstream end of said casing, each flap fitted on its inside face with a thermal protection plate to define a passage for cooling air delivered by said diaphragm, wherein the cooling air is provided by an annular duct defined by a first flexible annular gasket in sliding contact against the downstream inside face of the casing and against the upstream inside faces of the flaps under the pressure of the secondary flow, and defined on the inside by a second flexible annular gasket whose upstream end is fixed to the radially inner zone of the diaphragm, and whose downstream end is in sliding contact against the upstream inside face of the protection plates.

10 Claims, 3 Drawing Sheets

FIG.5
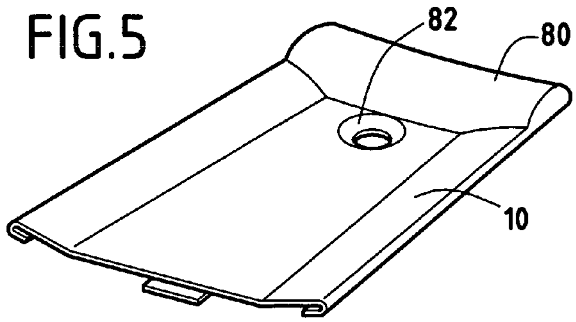
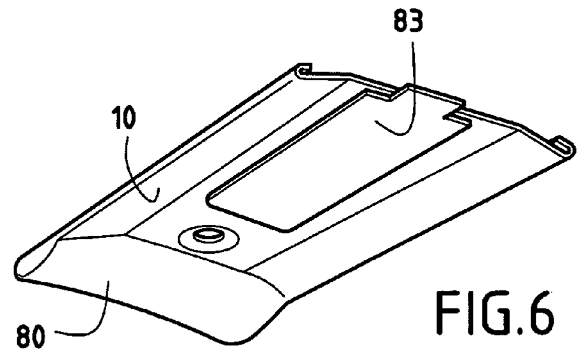
FIG.6
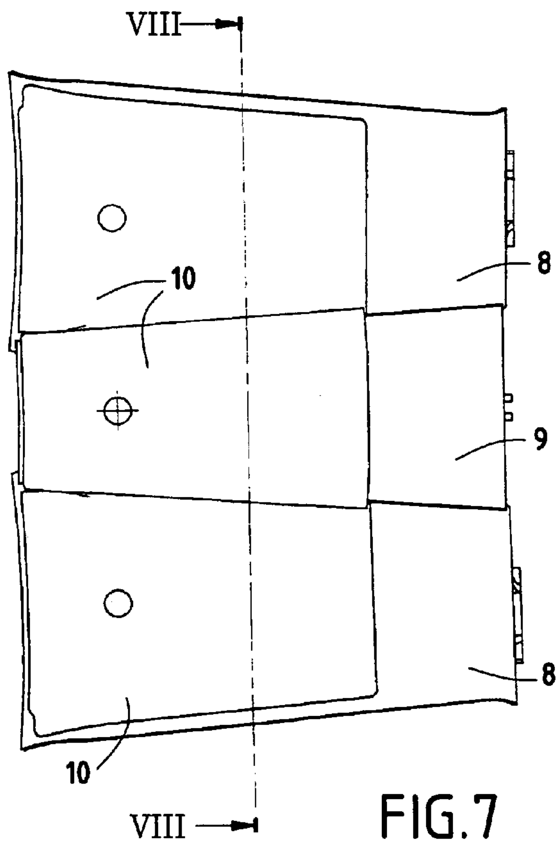
FIG.7
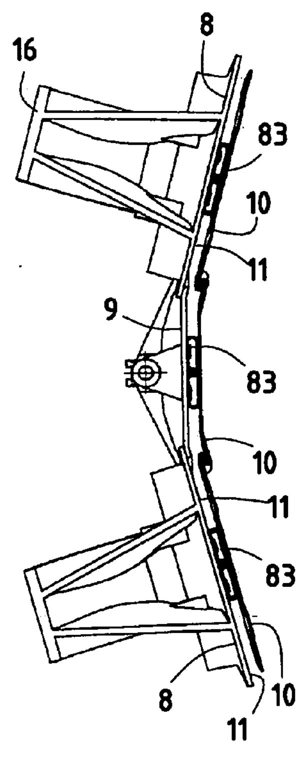
FIG.8

SYSTEM FOR SEALING THE SECONDARY FLOW AT THE INLET TO A NOZZLE OF A TURBOMACHINE HAVING A POST-COMBUSTION CHAMBER

FIELD OF THE INVENTION

The invention relates to problems of cooling the primary flaps of aviation turbomachines having a low dilution ratio and fitted with post-combustion chambers.

More precisely, the invention relates to an aviation turbomachine comprising, downstream from the turbine, a post-combustion chamber extended by at least one nozzle, said chamber being defined radially by a thermal protection lining disposed inside a casing, said casing and said lining together defining an annular channel in which, in operation, there flows a secondary flow, an annular diaphragm secured to said casing being disposed at the downstream end of said channel, said nozzle comprising a plurality of flaps hinged to the upstream end of said casing, each flap being fitted on its inside face with a thermal protection plate co-operating with said flap to define a passage for being fed with cooling air delivered by said diaphragm.

BACKGROUND OF THE INVENTION

Modern military engines operate with turbine outlet temperatures that are ever higher, thereby leading to temperatures at the nozzle flaps that are ever higher when operating in post-combustion modes. The maximum temperature limit of conventional materials has already been reached. In order to give flaps a suitable lifetime, it is therefore necessary to keep them at a temperature below such limits.

The increase in flap temperature also has the effect of increasing the infrared signature of the solid portions of the engine. To ensure that the airplane remains suitably discreet, or to make it more discreet, it is also necessary to reduce this temperature.

The use of the flow of secondary air downstream from the thermal protection lining is the means that avoids losing energy in order to cool the nozzle flaps by convection.

However, the transmission of this flow between the stationary portions of the post-combustion chamber and the moving portions of the nozzle must be performed in a manner that is as leak tight as possible.

U.S. Pat. No. 4,645,217 discloses a flexible sealing gasket disposed between the casing of the post-combustion chamber and an axially movable cylindrical sleeve supporting the flaps. This gasket sliding on the sleeve and fixed to the casing is constituted by two superposed plates having axial slots in alternation, and by a fabric that withstands high temperatures, interposed between the two plates. The ends of portions of one plate disposed between two consecutive slots are curved onto the edge of the other plate in order to enclose the fabric. That document does not teach that that type of gasket is capable of providing satisfactory sealing between a stationary annular part and a set of flaps hinged on said part.

OBJECTS AND SUMMARY OF THE INVENTION

The object of the invention is to propose a turbomachine as mentioned in the introduction, in which the leaks of secondary air, in particular towards the outside, between the annular channel and the passages of the flaps are eliminated so as to avoid losing engine performance.

This object is achieved by the fact that the feed of cooling air to said passages is provided by an annular duct defined on the outside by a first flexible annular gasket retained, in operation, pressed in sliding contact against the downstream inside face of the casing and against the upstream inside faces of the flaps under urging from the pressure of the cold secondary flow, and defined on the inside by a second flexible annular gasket whose upstream end is fixed to the radially inner zone of the diaphragm, and whose downstream end is pressed in sliding contact against the upstream inside face of the protection plates.

Thus, in operation, the first gasket is held under urging from the pressure of the secondary flux to press slidably against the downstream inside face of the casing and the upstream inside faces of the flaps, thereby preventing leaks of the cold secondary flow to the outside. The positioning of the first gasket naturally depends on the angular positioning of the flaps, and on any possible differences of expansion between the various parts.

In order to provide sealing between the diaphragm and the thermal protection lining, a third flexible annular gasket is advantageously provided between the two parts, this third gasket being retained upstream against said diaphragm with its downstream end pressing slidably against said protective lining.

Each annular gasket is constituted by a plurality of sectors, each comprising two superposed plates connected together and offset in the circumferential direction so that the edges of two adjacent sectors overlap, each plate presenting, downstream, a plurality of axial slots closed by another plate.

The slots extend over at least half the axial extent of said gaskets, and the plates of the sectors are bonded together by welding or by brazing.

These various dispositions of the gaskets provide good sealing of the gasket walls, together with a desired degree of stiffness.

The diaphragm is constituted by a channel section ring whose flanges extend upstream and whose web includes orifices, the radially outer flange being fixed to the casing by means leaving an annular gap between said flange and said casing, the upstream end of the first gasket being received with clearance in said gap.

This disposition ensures that, in operation, the upstream end is held under urging from the pressure of the secondary flow.

In contrast, the upstream end of the second gasket is held clamped between a support plate and the radially inside face of the radially inner flange by means of rivets fixing said support plate to said flange.

The upstream end of the third gasket is fixed to the radially inside face of the support plate by said rivets, and said rivets have heads pressing slidably against the outside face of the thermal protection lining.

According to another characteristic of the invention, each thermal protection plate is fixed to the associated flap by means of a single fastener device, said flap and said plate being prevented from moving relative to each other in rotation about said fastener device by an axial slideway and rail system, said protection plate presenting at its upstream end and on its radially inside face a surface that is convex in the axial direction, providing sealing by contact with the downstream end of the second gasket over the entire annular operating range of the nozzle.

BRIEF DESCRIPTION OF THE DRAWINGS

Other advantages and characteristics of the invention will appear on reading the following description given by way an example and made with reference to the accompanying drawings, in which:

FIG. 5 is a view from beneath of a plate for thermally protecting a flap;

FIG. 6 is a view of the outside face of a thermal protection plate;

FIG. 7 is a view seen from inside the nozzle of a set of primary flaps; and

FIG. 8 is a section through a set of primary flaps seen on line VIII—VIII of FIG. 7.

MORE DETAILED DESCRIPTION

Figure 1:
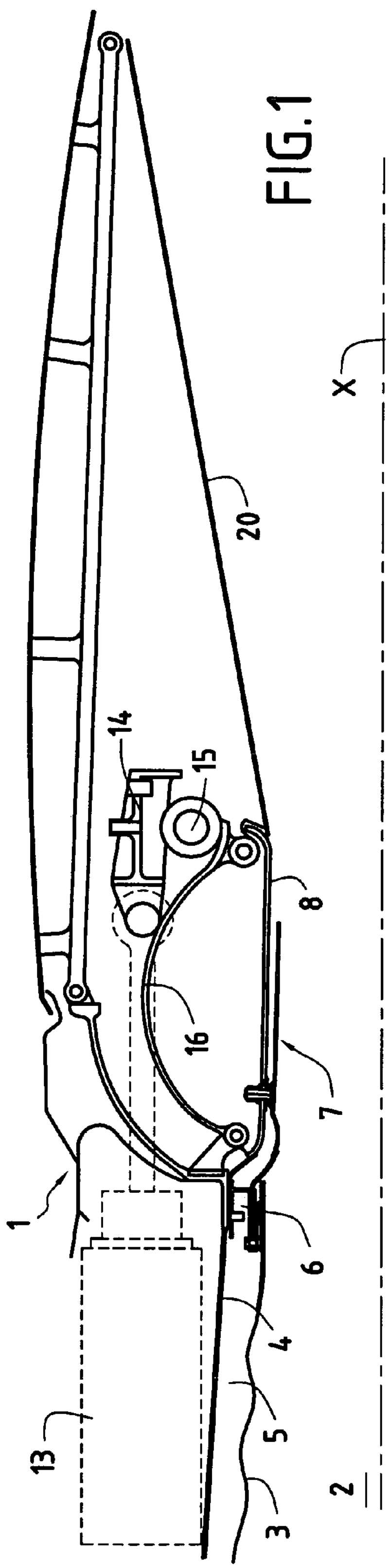
FIG. 1 is a half section on a plane containing the axis of the turbomachine of the invention, showing the rear portion of the post-combustion chamber and the convergent-divergent nozzle placed in line with the post-combustion chamber.
Figure 2:
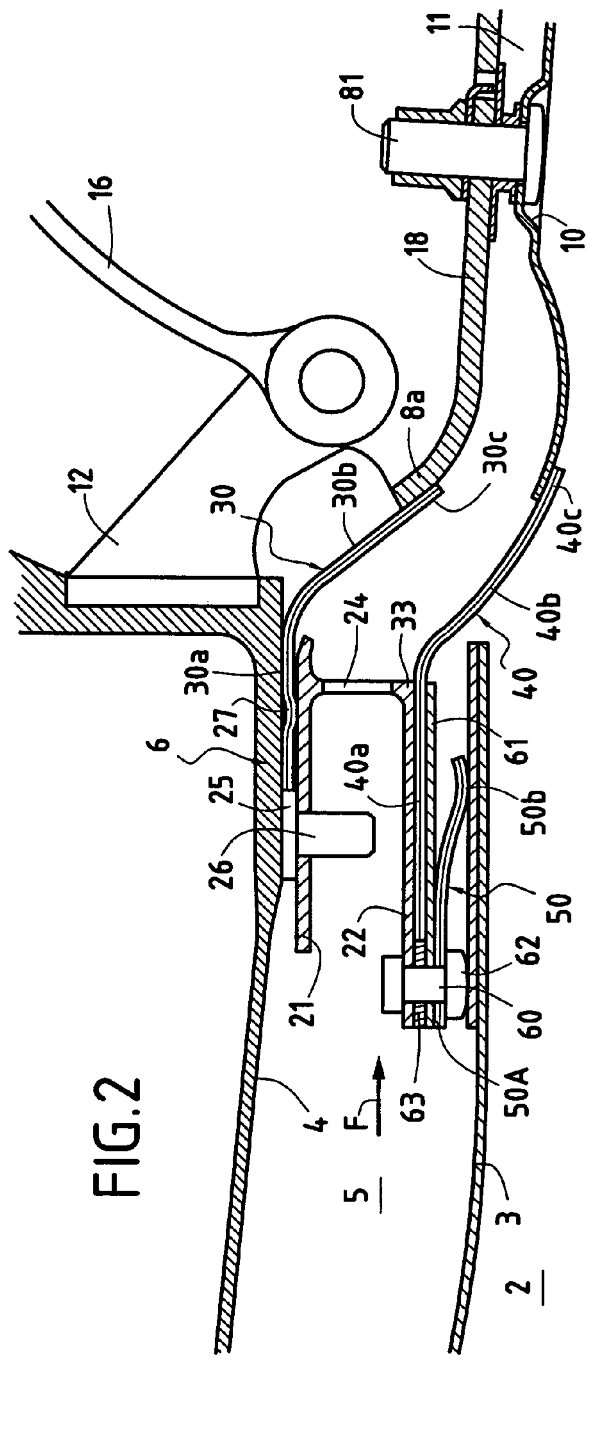
FIG. 2 is on a larger scale, showing the upstream portion of the annular channel of the secondary flow and the downstream portion of the nozzle, together with the disposition of the flexible gaskets between these two portions.

FIGS. 1 and 2 show the rear portion 1 of an aviation turbo-machine of axis X including, downstream from the turbine and not shown in the drawings, a post-combustion chamber 2 radially defined by a thermal protection lining 3, itself disposed inside an annular casing 4. Between them, the lining 3 and the casing 4 define an annular channel 5 in which there flows the secondary flow F and which includes at its downstream end a diaphragm 6 secured to the casing 4.

An axially symmetrical nozzle 7 is placed downstream from the post-combustion chamber 2.

This nozzle 7 compromises in particular a plurality of driven flaps 8 alternating with follower flaps 9 (see FIGS. 7 and 8) which present thermal protection plates 10 on their inside faces. Between them, the flaps 8 and 9 and the protection plates 10 define passages 11 for receiving the cooling air delivered by the diaphragm 6 to form a protective stream downstream from the thermal protection plates 10.

The flaps 8 and 9 are hinged at their upstream ends to arms 12 secured to the casing 4, and they are actuated, for example, by actuators 13 which move a control ring 14 axially, which ring presents wheels 15 co-operating with cam surfaces 16 provided on the outside faces of the controlled flaps 8. Other means for actuating the primary flaps 8 and 9 could be used without going beyond the ambit of the invention.

In FIG. 1, it can be seen that downstream from the primary flaps 8 and 9, the nozzle 7 includes a second ring of secondary flaps 20, in order to form a convergent-divergent nozzle. However, the invention can also apply to a nozzle that is convergent only.

As can be seen more clearly in FIG. 2, the diaphragm 6 is constituted by a 90° upsidedown channel section ring, having flanges 21 and 22 extending axially upstream in the channel 5, and having a radially extending web 23 that includes orifices 24 for passing the secondary flow F.

Fixing means 26 fix the radially outer flange 21 on the casing 4, with an interposed spacer 25 in the form of washers or a strip, thereby defining an annular gap 27 downstream from the spacer between the flange 21 and the casing 4.

However, the radially inner flange 22 is disposed at a significant distance from the downstream end 3*a* of the thermal protection lining 3 so as to enable to flexible sealing gaskets to be fixed at this location, as described below.

The above-defined gap 27 is designed to receive the upstream portion 30*a* of a first flexible annular sealing gasket 30 with clearance, the downstream portion 30*b* of the gasket generally being in the form of a cone converging downstream, with an end 30*c* that bears slidably on the upstream portions 8*a* of rounded shape of the flaps 8 and 9.

It should be observed that the first gasket 30 can move axially to some extent, depending on its stiffness, and under the pressure of the secondary flow F flowing in the annular channel 4 when the engine is in operation.

This disposition ensures that the upstream portion 30*a* of the first gasket 30 is pressed in positive manner against the inside face of the casing 5, and ensures that the downstream end 30*c* of the first gasket 38 presses in positive manner against the upstream inside surfaces of the flaps 8 and 9 over the entire angular operating range of the nozzle 7. The first gasket 30 thus acts at the hinges of the nozzle 7 to provide sealing between the secondary flow F and the outside.

The radially inner flange 22 of the diaphragm 6 holds the upstream end 40*a* of a second flexible annular gasket 40 and the upstream end 50*a* of a third flexible annular gasket 50, by means of a plurality of rivets 60 passing through orifices formed in the upstream ends of the gaskets 40 and 50, in the upstream end of the flange 22, and in an annular support plate 61 interposed between the second gasket 40 and the third gasket 50. The rivets 60 present heads 62 bearing slidably against the outside face of the thermal protection lining 3. They act like skids during maximum axial expansion of said lining 3 and they also serve the centre it during all modes of operation of the post-combustion chamber.

The upstream end 40*a* of the second gasket 40 is interposed between the support plate 61 and the radially inner face of the flange 22. Preferably, washers 63 surround the rivets 60, being interposed between the support plate 61 and the flange 22 in order to provide a gap between these two parts into which the upstream end 40*a* of the second gasket 40 is inserted, said upstream end 40*a* presenting notches that co-operate with the washers 63 in order to position the second gasket 40 accurately in the circumferential direction.

The second gasket 40 also presents a downstream portion 40*b* in the form of a cone converging downstream and having a downstream end 40*c* coming to bear against the upstream inside faces of the thermal protection plates 10.

The upstream end 50*a* of the third gasket 50 is fixed on the rivets 60, and the downstream end 50*c* of the third gasket bears slidably against the outside face of the thermal protection lining 3. The role of this third gasket 50 is to guarantee sealing between the diaphragm 6 and the thermal protection lining 3.

Figure 3A:
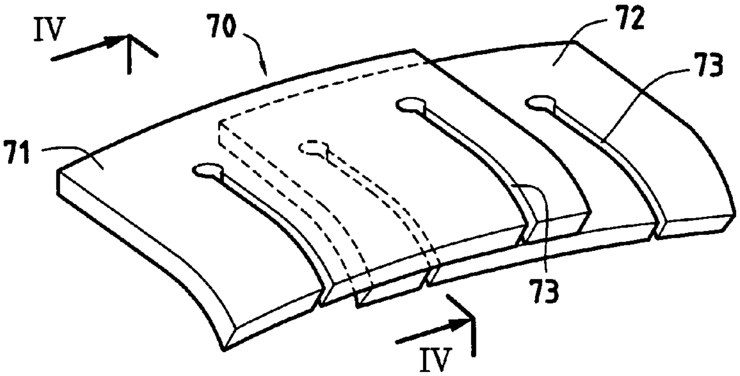
FIGS. 3A to 3C are perspective views of a gasket sector.
Figure 3B:
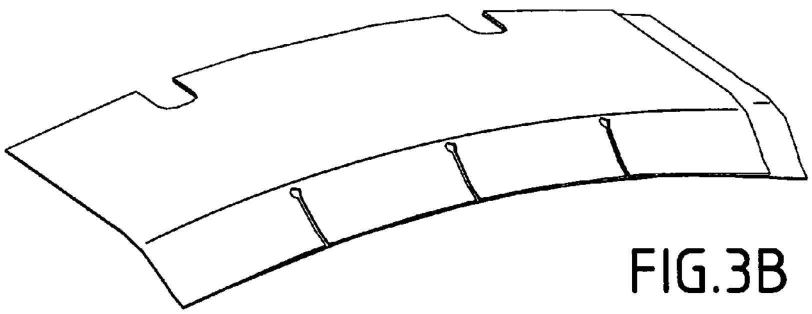
Figure 3C:
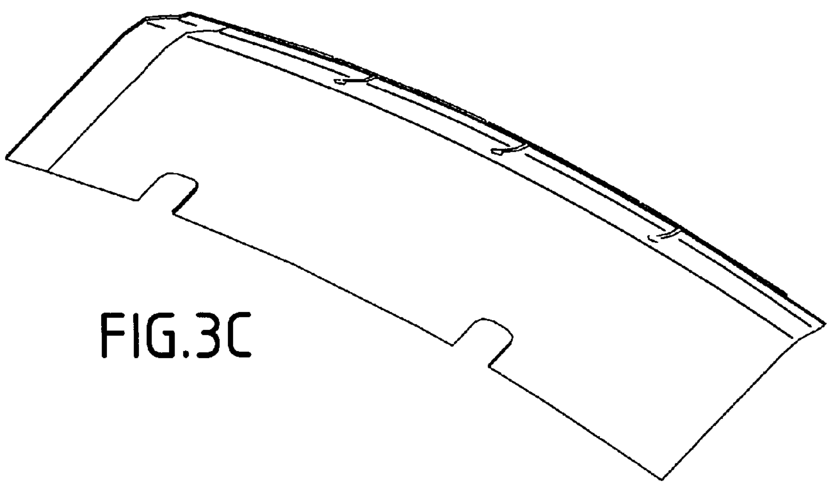
Figure 4:
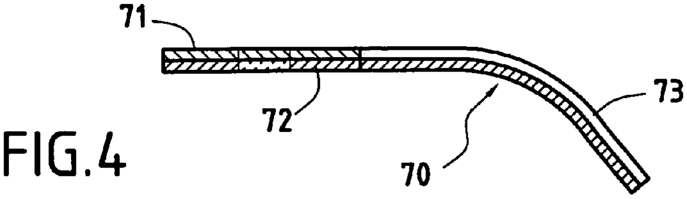
FIG. 4 is a section on line IV—IV of FIG. 3 showing a gasket sector.

FIGS. 3 and 4 show the configuration of each of the gaskets 30, 40, and 50.

As can be seen in FIGS. 3A to 3C and in FIG. 4, each gasket is constituted by a plurality of sectors 70 that overlap partially in the circumferential direction. Each sector 70 is formed by superposing two sheet metal plates 71 and 72 that are offset circumferentially by a distance corresponding to the overlap of two adjacent sectors 70. Each plate 70 and 71 is shaped in presses, and is then cut to present axial notches 73 over substantially half of its axial extent. Thereafter, the two plates 70 and 71 forming a sector 70 are superposed with circumferential offset so that the slots 73 in any-one of these plates alternate circumferentially with the slots in the other plate, and they are rigidly bonded together, preferably by welding or brazing. However, the various sectors 70 are not bonded together, thus making it easy to change a sector 70 if it becomes worn.

In order to obtain sealing over the entire angular range of operation of the flaps 8 and 9, both at the second gasket 40 and at the thermal protection plates 10 of the flaps 8 and 9, the thermal protection plates 10 possess an appropriate shape at their surfaces 80 which come into contact with the downstream end 40*c* of the second gasket 40.

As shown in FIGS. 5 and 6, for each plate 10, this surface 80 is convex in the axial direction and slightly concave in the circumferential direction.

Each thermal protection plate 10 is fixed on the corresponding flaps 8 or 9 by a single fixing point, for example by means of a screw 81 embedded in a recess 82 in the protection plate 10, placed in the central upstream portion of said plate, which constitutes the stationary bridge around which said plate 10 can expand freely. To hold it laterally and radially, an axial guide rail 83 provided on its outside face co-operates with a slideway provided on the inside face of the corresponding flap 8 or 9.

What is claimed is:

1. An aviation turbomachine comprising, downstream from the turbine, a post-combustion chamber extended by at least one nozzle, said chamber being defined radially by a thermal protection lining disposed inside a casing, said casing and said lining together defining an annular channel in which, in operation, there flows a secondary flow, an annular diaphragm secured to said casing being disposed at the downstream end of said channel, said nozzle comprising a plurality of flaps hinged to the upstream end of said casing, each flap being fitted on its inside face with a thermal protection plate co-operating with said flap to define a passage for being fed with cooling air delivered by said diaphragm, wherein the feed of cooling air to said passages is provided by an annular duct defined on the outside by a first flexible annular gasket retained, in operation, pressed in sliding contact against the downstream inside face of the casing and against the upstream inside faces of the flaps under urging from the pressure of the secondary flow, and defined on the inside by a second flexible annular gasket whose upstream end is fixed to the radially inner zone of the diaphragm, and whose downstream end is pressed in sliding contact against the upstream inside face of the protection plates.

2. A turbomachine according to claim 1, further including a third flexible annular gasket for providing sealing between the diaphragm and the thermal protection lining, said third gasket being held upstream against the diaphragm with its downstream end bearing slidably against said protection lining.

3. A turbomachine according to claim 1, wherein each annular gasket is constituted by a plurality of sectors, each comprising two superposed plates connected together and offset in the circumferential direction so that the edges of two adjacent sectors overlap, each plate presenting, downstream, a plurality of axial slots closed by another plate.

4. A turbomachine according to claim 3, wherein the slots extend over at least half the axial extent of said gaskets.

5. A turbomachine according to claim 3, wherein the plates of the sectors are connected together by welding or by brazing.

6. A turbomachine according to claim 1, wherein the diaphragm is constituted by a channel section ring whose flanges extend upstream and whose web includes orifices, the radially outer flange being fixed to the casing by means leaving an annular gap between said flange and said casing, the upstream end of the first gasket being received with clearance in said gap.

7. A turbomachine according to claim 6, wherein the upstream end of the second gasket is held clamped between a support plate and the radially inside face of the radially inner flange by means of rivets fixing said support plate to said flange.

8. A turbomachine according to claim 7, further including a third flexible annular gasket for providing sealing between the diaphragm and the thermal protection lining, said third gasket being held upstream against the diaphragm with its downstream end bearing slidably against said protection lining, and wherein the upstream end of the third gasket is fixed to the radially inside face of the support plate by said rivets.

9. A turbomachine according to claim 7, wherein said rivets have heads bearing slidably against the outside face of the protective lining.

10. A turbomachine according to claim 1, wherein each thermal protection plate is fixed to the associated flap by means of a single fastener device, said flap and said plate being prevented from moving relative to each other in rotation about said fastener device by an axial slideway and rail system, said protection plate presenting at its upstream end and on its radially inside face a surface that is convex in the axial direction, providing sealing by contact with the downstream end of the second gasket over the entire annular operating range of the nozzle.

* * * * *